(12) United States Patent
Zha

(10) Patent No.: US 10,295,832 B2
(45) Date of Patent: May 21, 2019

(54) SLIT GRATING APPLIED IN AUTOSTEREOSCOPIC DISPLAY APPARATUS AND AUTOSTEREOSCOPIC DISPLAY APPARATUS

(71) Applicant: Wuhan China Star Optoelectronics Technology Co., Ltd., Wuhan, Hubei (CN)

(72) Inventor: Guowei Zha, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 256 days.

(21) Appl. No.: 15/115,612

(22) PCT Filed: Jul. 5, 2016

(86) PCT No.: PCT/CN2016/088503
§ 371 (c)(1),
(2) Date: Jul. 29, 2016

(87) PCT Pub. No.: WO2017/206265
PCT Pub. Date: Dec. 7, 2017

(65) Prior Publication Data
US 2018/0203241 A1    Jul. 19, 2018

(30) Foreign Application Priority Data

Jun. 1, 2016   (CN) .................. 2016 1 03823230

(51) Int. Cl.
*G02B 5/30* (2006.01)
*G02B 27/22* (2018.01)
(Continued)

(52) U.S. Cl.
CPC .............. *G02B 27/22* (2013.01); *G02B 5/30* (2013.01); *H04N 13/359* (2018.05); *H04N 13/31* (2018.05)

(58) Field of Classification Search
CPC ...... G02B 27/22; H04H 13/31; H04N 13/359; H04N 13/0409; H04N 13/0454
See application file for complete search history.

(56) References Cited

U.S. PATENT DOCUMENTS

| 6,040,807 A | 3/2000 | Hamagishi et al. |
| 2007/0087549 A1* | 4/2007 | Yamaki ................ G02B 5/3058 438/613 |

(Continued)

FOREIGN PATENT DOCUMENTS

| CN | 202133849 U | 2/2012 |
| CN | 103135280 A | 6/2013 |
| CN | 104614866 A | 5/2015 |

*Primary Examiner* — Charles V Hicks
(74) *Attorney, Agent, or Firm* — Andrew C. Cheng

(57) ABSTRACT

The present disclosure is to provide a slit grating applied in autostereoscopic display apparatus and autostereoscopic display apparatus. The slit grating includes a substrate and a plurality of light-shielding strips arranged in intervals on the substrate; the light-shielding strips is used to shielding incident light; the slit grating further includes a wire grid among a light-transmitting region between the light-shielding strips, and the wire grid is used to transmitting a first polarized component of the incident light and reflecting a second polarized component that is perpendicular to the first polarized component of the incident light. The autostereoscopic display apparatus includes a backlight module, a liquid crystal display and the slit grating. The present disclosure can improve brightness of display device, and achieve cost decreasing and thickness reducing at the same time.

17 Claims, 4 Drawing Sheets

(51) Int. Cl.
*H04N 13/31* (2018.01)
*H04N 13/359* (2018.01)

(56) References Cited

U.S. PATENT DOCUMENTS

| | | | |
|---|---|---|---|
| 2008/0165296 A1* | 7/2008 | Kim | H04N 13/359 349/15 |
| 2014/0184960 A1 | 7/2014 | Yang | |
| 2015/0130751 A1* | 5/2015 | Teraguchi | G02F 1/13338 345/174 |

* cited by examiner 41  430    43

41  430    43

SLIT GRATING APPLIED IN AUTOSTEREOSCOPIC DISPLAY APPARATUS AND AUTOSTEREOSCOPIC DISPLAY APPARATUS

FIELD OF INVENTION

The disclosure is related to a technical filed of autostereoscopic display, in particular to a slit grating applied in autostereoscopic display apparatus and autostereoscopic display apparatus.

BACKGROUND OF THE DISCLOSURE

Three-dimensional (3D) display technology has been an inevitable display technology development trend in the feature according to the ccognitive style that are familiar by people in natural, wherein autostereoscopic 3D technology is very popular because complex auxiliary apparatus is not in need.

There are various ways to achieve autostereoscopic 3D, including gating and lenticular lens; wherein, the grating technology can avoid image crosstalk efficiently among different views to achieve better three-dimensional display efficiency. However, because about half light of the transmitting light are shielded by light-shielding portions of the grating, the brightness of the 3D mold is damaged up to about half, and brightness of 2D image is obvious decreased in 2D/3D switchable display. Therefore, corresponding technologies are necessary to be applied to solve the problem.

As shown in FIG. 1, FIG. 1 is a structural schematic diagram showing traditional post-mounted autostereoscopic display apparatus, comprising a backlight module 1, a brightness enhancement film 2, a grating layer 3, a lower polarizer 4, a liquid crystal display 5 and an upper polarizer 6 stacking in sequence; wherein, the backlight module 1 comprises a LED 11, a light guide plate 12 and a diffuser 13; the LED 11 is set on a side of the light guide plate 12, and the diffuser 13 is set above the light guide plate 12. As shown in FIG. 2, FIG. 2 is a plane structural schematic diagram of the grating layer in the related art. The grating layer 3 comprises a plurality of light-shielding strips 31 arranged in intervals, the light-shielding strips 31 are light-shielding regions, and light-transmitting regions 32 are between two light-shielding strips 31. In the backlight module 1, apart of polarized light can be reused through the brightness enhancement film 2 and gets better obviously; however, light of the light-shielding regions is still damaged when passing through the grating layer 3.

SUMMARY OF THE INVENTION

An objective of the present disclosure is to provide a slit grating applied in autostereoscopic display apparatus and autostereoscopic display apparatus for solving brightness loss problem causing by light-shielding regions of a grating in the related art.

To implement above objective, the present disclosure applies a technical solutions is: a slit grating applied in autostereoscopic display apparatus is provided; the slit grating comprises a substrate and a plurality of light-shielding strips arranged in intervals on the substrate; the light-shielding strips is used to shielding incident light; the slit grating further comprises a wire grid among a light-transmitting region between the light-shielding strips, and the wire grid is used to transmitting a first polarized component of the incident light and then reflecting a second polarized component of the incident light; wherein, the second polarized component is perpendicular to the first polarized component; and, the light-shielding strips further reflect the incident light; the wire grid comprises a plurality of metal wires arranged in intervals among the light-transmitting region.

To implement above objective, the present disclosure applies another technical solutions is: a slit grating applied in autostereoscopic display apparatus is provided; the slit grating comprises a substrate and a plurality of light-shielding strips arranged in intervals on the substrate; the light-shielding strips is used to shielding incident light; the slit grating further comprises a wire grid among a light-transmitting region between the light-shielding strips, and the wire grid is used to transmitting a first polarized component of the incident light and then reflecting a second polarized component of the incident light; wherein, the second polarized component is perpendicular to the first polarized component.

Wherein, the light-shielding strips further reflect the incident light.

Wherein, the wire grid comprises a plurality of metal wires arranged in intervals among light-transmitting region.

Wherein, the metal wires and the light-shielding strips are set in parallel or in incline.

Wherein, the wire grid further comprises a dielectric layer between the metal wires and the substrate.

Wherein, the dielectric layer is further set between the light-shielding strips and the substrate.

Wherein, material of the metal wires is at least one element selected from a group consisting of Al, Ag and Au, and material of the dielectric layer is at least one element selected from a group consisting of $SiO_2$, SiO, MgO, $Si_3N_4$, $TiO_2$ and $Ta_2O_5$.

Wherein, an arrangement cycle between the light-shielding strips is 30-300 μm, and an arrangement cycle between the metal wires is 20-500 nm.

Wherein, the light-shielding strips are metal strips, and the light-shielding strips and the metal wires are formed from the same metal layer by applying pattern technology.

To implement above objective, the present disclosure applies another technical solutions is: an autostereoscopic display apparatus is provided; the autostereoscopic display apparatus comprises a backlight module, a liquid crystal display and a slit grating, and the slit grating is arranged between the backlight module and the liquid crystal display;

the slit grating comprises a substrate and a plurality of light-shielding strips arranged in intervals on the substrate, the light-shielding strips are used to shielding incident light, the slit grating further comprises a wire grid among a light-transmitting region between the light-shielding strips, and the wire grid is used to transmitting a first polarized component of the incident light and reflecting a second polarized component of the incident light; wherein, the second polarized component is perpendicular to the first polarized component.

Wherein, the light-shielding strips further reflect the incident light.

Wherein, the wire grid comprises a plurality of metal wires arranged in intervals among light-transmitting region.

Wherein, the metal wires and the light-shielding strips are set in parallel or in incline.

Wherein, the wire grid further comprises a dielectric layer between the metal wires and the substrate.

Wherein, the dielectric layer is further set between the light-shielding strips and the substrate.

Wherein, material of the metal wires is at least one element selected from a group consisting of Al, Ag and Au, and material of the dielectric layer is at least one element selected from a group consisting of SiO2, SiO, MgO, Si3N4, TiO2 and Ta2O5.

Wherein, an arrangement cycle between the light-shielding strips is 30-300 μm, and an arrangement cycle between the metal wires is 20-500 nm.

Wherein, the light-shielding strips are metal strips, and the light-shielding strips and the metal wires are formed from the same metal layer by applying pattern technology.

The advantages of the present disclosure are: to distinguish the differences from the related art, the present disclosure set the wire grid that can transmit a first polarized component of the incident light and reflect a second polarized component of the incident light among the light-transmitting region; as a result, the wire grid is capable of recycling light field. When the slit grating is applied in autostereoscopic display apparatus, brightness of display device can be improve and brightness enhancement film and lower polarizer of traditional display device are removed as well; thus, the advantages include cost decreasing and thickness reducing.

DETAILED DESCRIPTION OF THE PREFERRED EMBODIMENTS

To make those skilled in the art better understand the technical solution of the present invention, the present disclosure will be further described in detail below in conjunction with the accompanying drawings and a specific embodiment.

Figure 1:
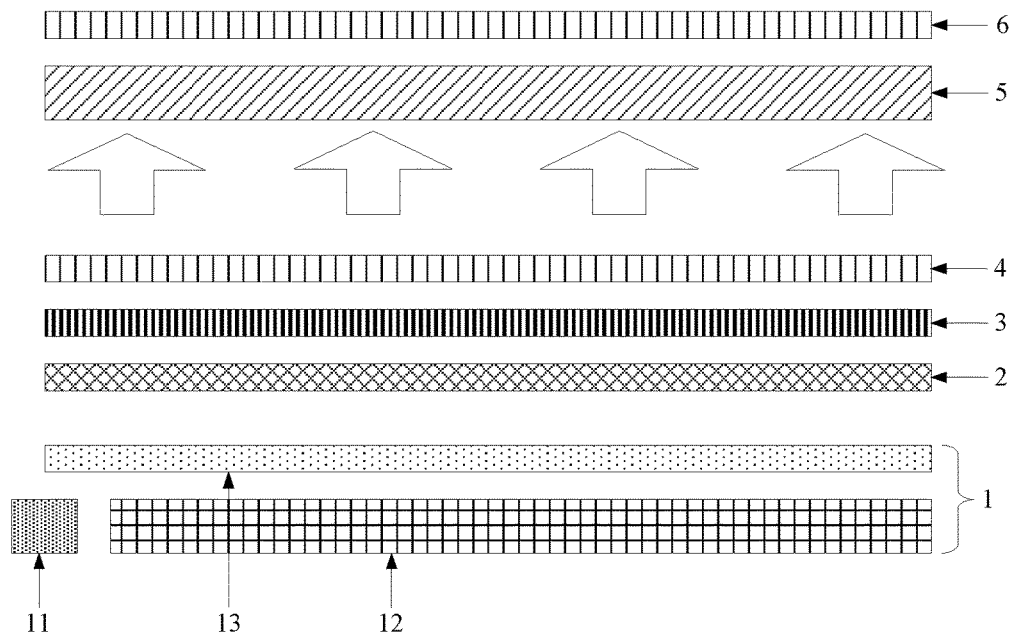
FIG. 1 is a structural schematic diagram showing traditional post-mounted autostereoscopic display apparatus.
Figure 2:
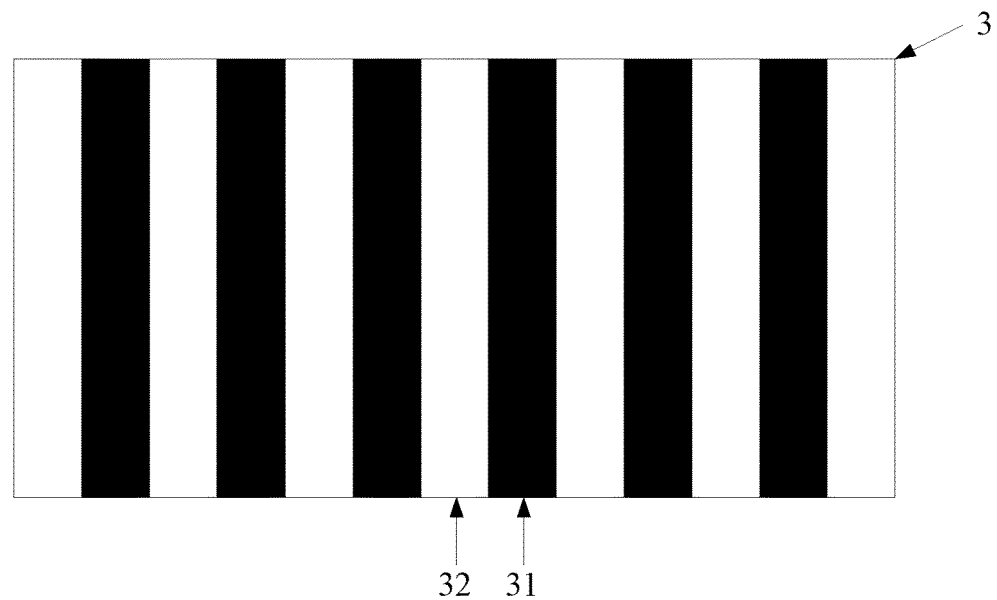
FIG. 2 is a plane structural schematic diagram of the grating layer in the related art.
Figure 3:
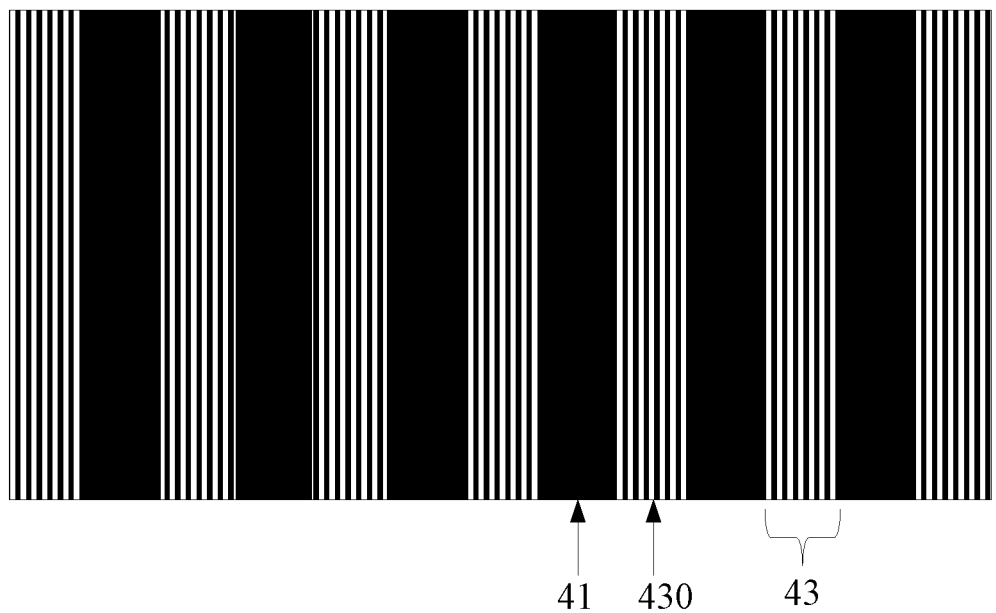
FIG. 3 is a structural schematic diagram of a slit grating applied in autostereoscopic display apparatus with an embodiment of the present disclosure.

Referring to FIG. 3, FIG. 3 is a structural schematic diagram of a slit grating applied in autostereoscopic display apparatus with an embodiment of the present disclosure.

The present disclosure provides a slit grating applied in autostereoscopic display apparatus, wherein, the slit grating comprises a substrate (not shown in Figure) and a plurality of light-shielding strips 41 arranged in intervals on the substrate; the light-shielding strips 41 is used to shielding incident light; regions of the light-shielding strips 41 are light-shielding regions, and light-transmitting regions 42 are between the light-shielding strips 41, wherein, the light-shielding regions and the light-transmitting regions 42 are arranged in periods. The slit grating further comprises a wire grid among a light-transmitting region 42 between the light-shielding strips 41, and the wire grid 43 is used to transmitting a first polarized component of the incident light and reflecting a second polarized component of the incident light; wherein, the second polarized component is perpendicular to the first polarized component.

When the incident light passes through the slit grating, apart of the incident light is shielded by the light-shielding strips 41, but another part of the incident light are into the light-transmitting region 42; wherein, the first polarized component passes through the slit grating 43 among the light-transmitting region, and the second polarized component is reflected by the slit grating 43 so that the part of the incident light can be recycled for improve brightness of display device.

To distinguish the differences from the related art, the present disclosure set the wire grid 43 that can transmit a first polarized component of the incident light and reflect a second polarized component of the incident light among the light-transmitting region 42; as a result, the wire grid 43 is capable of recycling light field. When the slit grating is applied in autostereoscopic display apparatus, brightness of display device can be improved and brightness enhancement film and lower polarizer of traditional display device are removed as well; thus, the advantages are cost decreasing and thickness reducing.

Specifically, the light-shielding strips 41 of the embodiment reflect the incident light, and then the incident light that is reflected can be recycled so that brightness of the autostereoscopic display apparatus will increase significantly.

The wire grid 43 comprises a plurality of metal wires 430 arranged in intervals among the light-transmitting region; metal material forming the metal wires 430 has a larger imaginary part of refractive index, such as at least one element selected from a group consisting of Al, Ag and Au; therefore, reflectivity of the second polarized component of the incident light can be improve, and the second polarized component of the incident light can be reflected effectively. For example, the first polarized component of the embodiment is transverse magnetic polarized light perpendicular to the wire grid, and the second polarized component of the embodiment is transverse electric polarized light parallel to the light-shielding strips.

To further enhance reflectivity of the incident light for the light-shielding strips 41, the light-shielding strips 41 formed by metal can be adopted. In an embodiment, the light-shielding strips 41 formed by metal having a larger imaginary part of refractive index, such as at least one element selected from a group consisting of SiO2, SiO, MgO, Si3N4, TiO2 and Ta2O5 consistent with the metal wires. The light-shielding strips 41 and the metal wires 430 can be single-layer structure, and in manufacturing process, the light-shielding strips 41 and the metal wires 430 can be formed from the same metal layer by applying pattern technology to simplify the manufacturing process. Moreover, the light-shielding strips 41 and the metal wires 430 can be composite structure composing by single-layer structure respectively.

An arrangement cycle between the light-shielding strips 41 is 30-300 μm, such as 100 μm, 150 μm, 200 μm or 270 μm. An arrangement cycle between the metal wires 430 is smaller than 1 μm. For example, an arrangement cycle between the metal wires 430 is 20-500 nm and a duty cycle between the metal wires is 0.1-0.9 so that the light-shielding strips 41 and the metal wires 430 will not conflict to each other.

Figure 4:
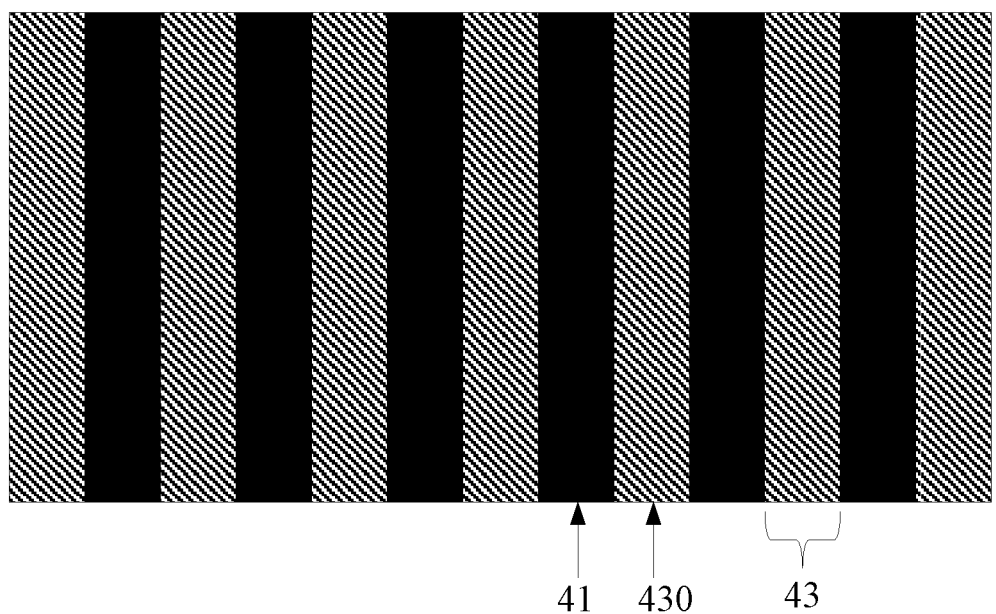
FIG. 4 is a structural schematic diagram of a slit grating applied in autostereoscopic display apparatus with another embodiment of the present disclosure.

In the slit grating as shown in FIG. 3, the metal wires 430 are arranged parallel with the light-shielding strips 41; furthermore, the metal wires 430 can be arranged inclined with the light-shielding strips 41. As shown in FIG. 4, FIG. 4 is a structural schematic diagram of a slit grating applied in autostereoscopic display apparatus with another embodiment of the present disclosure. Arrangement direction of the metal wires 430 will decide transmitting and reflecting of polarize of polarization state; thus, arrangement direction of the metal wires 430 should be considered by specific polarized demands.

Figure 5:
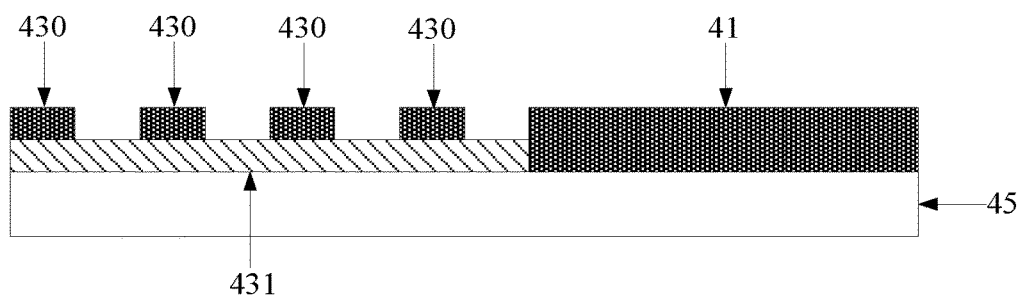
FIG. 5 is a sectional structural schematic diagram of a slit grating applied in autostereoscopic display apparatus with an embodiment of the present disclosure.

In another embodiment, the wire grid 43 comprises a dielectric layer between the metal wires 430 and the substrate 45. As shown in FIG. 5, FIG. 5 is a sectional structural schematic diagram of a slit grating applied in autostereoscopic display apparatus of the present disclosure. Wherein, material of the dielectric layer 431 is at least one element selected from a group consisting of SiO2, SiO, MgO, Si3N4, TiO2 and Ta2O5.

Figure 6:
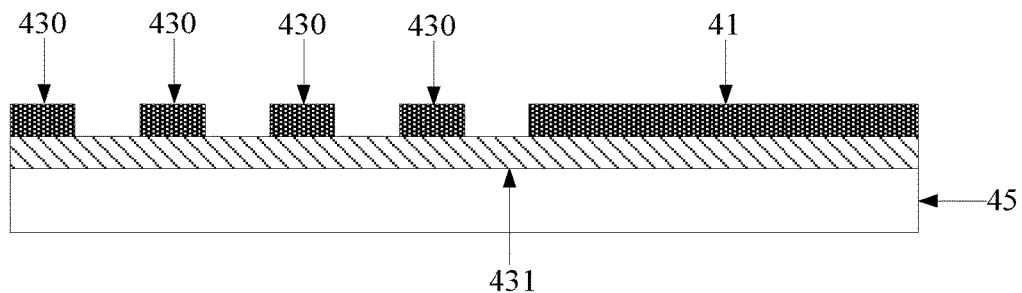
FIG. 6 is a sectional structural schematic diagram of a slit grating applied in autostereoscopic display apparatus with an embodiment of the present disclosure.

It is worth mentioning that in another embodiment, the dielectric layer 431 can be set between the light-shielding strips 41 and the substrate 45. As shown in FIG. 6, FIG. 6 is a sectional structural schematic diagram of a slit grating applied in autostereoscopic display apparatus of the present disclosure.

Figure 7:
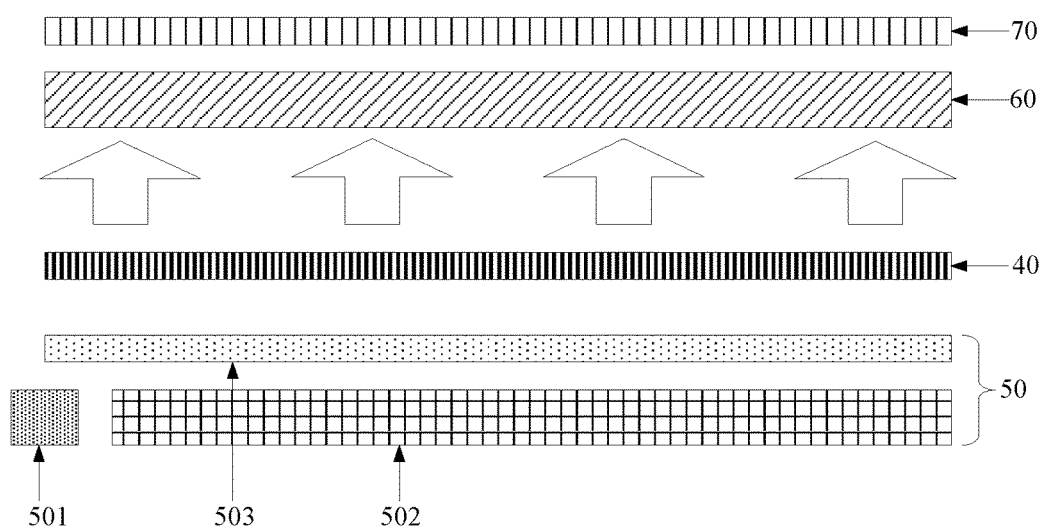
FIG. 7 is a structural schematic diagram of an autostereoscopic display apparatus with an embodiment of the present disclosure.

The present disclosure also provides an autostereoscopic display apparatus. As shown in FIG. 7, FIG. 7 is a structural schematic diagram of an autostereoscopic display apparatus with an embodiment of the present disclosure. The autostereoscopic display apparatus comprises a backlight module 50, a liquid crystal display 60 and a slit grating 40, wherein the slit grating 40 is any one of the slit grating 40 of the above embodiments, and the slit grating 40 is arranged between the backlight module 50 and the liquid crystal display 60.

Specifically, the backlight module 50 comprises a LED source 501, a light guide plate 502 and a diffuser 503; as shown in FIG. 7, the LED 501 is set on a side of the light guide plate 502, and the diffuser 503 is set above the light guide plate 502. Because the autostereoscopic display apparatus adopts the slit grating 40 of the above embodiment of the present disclosure, both light-shielding strips of the slit grating 40 and metal wires of the wire grid among light-transmitting regions can reflect the incident light and are capable of recycling light field; as a result, brightness of display device can be improve and brightness enhancement film and lower polarizer of traditional display device are removed as well; thus, it turns into cost decreasing and thickness reducing.

To sum up, the present disclosure can improve brightness of display device, and also can reduce cost and thickness of products.

Even though information and the advantages of the present embodiments have been set forth in the foregoing description, together with details of the mechanisms and functions of the present embodiments, the disclosure is illustrative only; and that changes may be made in detail, especially in matters of shape, size and arrangement of parts within the principles of the present embodiments to the full extend indicated by the broad general meaning of the terms in which the appended claims are expressed.

The invention claimed is:

1. A slit grating used for being applied in an autostereoscopic display apparatus, comprising a substrate and a plurality of light-shielding strips arranged in intervals on the substrate, wherein the light-shielding strips are used to shield incident light, the slit grating further comprises a wire grid among a light-transmitting region between the light-shielding strips, wherein the wire grid is used to transmit a first polarized component of the incident light and reflect a second polarized component of the incident light which is perpendicular to the first polarized component, the light-shielding strips further reflect the incident light, and the wire grid comprises a plurality of metal wires arranged in intervals among the light-transmitting region; wherein a duty cycle between the metal wires is 0.1 to 0.9.

2. A slit grating used for being applied in an autostereoscopic display apparatus, comprising a substrate and a plurality of light-shielding strips arranged in intervals on the substrate, wherein the light-shielding strips are used to shield incident light, the slit grating further comprises a wire grid among a light-transmitting region between the light-shielding strips, wherein the wire grid is used to transmit a first polarized component of the incident light and reflect a second polarized component of the incident light which is perpendicular to the first polarized component; wherein the wire grid comprises a plurality of metal wires arranged in intervals among the light-transmitting region; wherein a duty cycle between the metal wires is 0.1 to 0.9.

3. The slit grating according to claim 2, wherein the light-shielding strips further reflect the incident light.

4. The slit grating according to claim 2, wherein the metal wires and the light-shielding strips are set in parallel or in incline.

5. The slit grating according to claim 2, wherein the wire grid further comprises a dielectric layer between the metal wires and the substrate.

6. The slit grating according to claim 5, wherein the dielectric layer is further set between the light-shielding strips and the substrate.

7. The slit grating according to claim 5, wherein material of the metal wires is at least one element selected from a group consisting of Al, Ag and Au, and material of the dielectric layer is at least one element selected from a group consisting of SiO2, SiO, MgO, Si3N4, TiO2 and Ta2O5.

8. The slit grating according to claim 2, wherein an arrangement cycle between the light-shielding strips is 30-300 μm, and an arrangement cycle between the metal wires is 20-500 μm.

9. The slit grating according to claim 2, wherein the light-shielding strips are metal strips, and the light-shielding strips and the metal wires are formed from the same metal layer by applying pattern technology.

10. An autostereoscopic display apparatus, comprising:
a backlight module;
a liquid crystal display; and
a slit grating arranged between the backlight module and the liquid crystal display, wherein the slit grating comprises a substrate and a plurality of light-shielding strips arranged in intervals on the substrate, wherein the light-shielding strips are used to shield incident light, the slit grating further comprises a wire grid among a light-transmitting region between the light-shielding strips, wherein the wire grid is used to transmit a first polarized component of the incident light and reflect a second polarized component of the incident light which is perpendicular to the first polarized component; wherein the wire grid comprises a plurality of metal wires arranged in intervals among the light-transmitting region; wherein a duty cycle between the metal wires is 0.1 to 0.9.

11. The autostereoscopic display apparatus according to claim 10, wherein the light-shielding strips further reflect the incident light.

12. The autostereoscopic display apparatus according to claim 10, wherein the metal wires and the light-shielding strips are set in parallel or in incline.

13. The autostereoscopic display apparatus according to claim 10, wherein the wire grid further comprises a dielectric layer between the metal wires and the substrate.

14. The autostereoscopic display apparatus according to claim 13, wherein the dielectric layer is further set between the light-shielding strips and the substrate.

15. The autostereoscopic display apparatus according to claim 13, wherein material of the metal wires is at least one element selected from a group consisting of Al, Ag and Au, and material of the dielectric layer is at least one element selected from a group consisting of $SiO_2$, SiO, MgO, $Si_3N_4$, $TiO_2$ and $Ta_2O_5$.

16. The autostereoscopic display apparatus according to claim 10, wherein an arrangement cycle between the light-shielding strips is 30-300 μm, and an arrangement cycle between the metal wires is 20-500 nm.

17. The autostereoscopic display apparatus according to claim 10, wherein the light-shielding strips are metal strips, and the metal wires are formed from the same metal layer by applying pattern technology.

\* \* \* \* \*